United States Patent [19]
Mahale et al.

[11] Patent Number: 6,141,350
[45] Date of Patent: Oct. 31, 2000

[54] AUTO-NEGOTIATION USING NEGATIVE LINK PULSES

[75] Inventors: Dinesh Mahale, Newark; Thomas J. Runaldue, San Jose, both of Calif.

[73] Assignee: Advanced Micro Devices, Inc., Sunnyvale, Calif.

[21] Appl. No.: 09/291,036

[22] Filed: Apr. 14, 1999

Related U.S. Application Data

[60] Provisional application No. 60/082,183, Apr. 17, 1998.

[51] Int. Cl.[7] .................................. H04L 12/40; H04J 3/02
[52] U.S. Cl. ............................ 370/438; 370/462; 370/445
[58] Field of Search ...................................... 370/294, 296, 370/434, 445, 446, 447, 465, 466, 461, 462, 437, 449, 438

[56] References Cited

U.S. PATENT DOCUMENTS

| | | | |
|---|---|---|---|
| 5,546,543 | 8/1996 | Yang et al. | 395/250 |
| 5,586,117 | 12/1996 | Edem et al. | 370/466 |
| 5,610,903 | 3/1997 | Crayford | 370/213 |
| 5,727,006 | 3/1998 | Dreyer et al. | 371/68.1 |
| 5,737,108 | 4/1998 | Bunch et al. | 359/152 |
| 5,783,873 | 7/1998 | Dohan et al. | 307/104 |
| 5,809,026 | 9/1998 | Wong et al. | 370/445 |
| 5,809,249 | 9/1998 | Julyan | 395/200.53 |
| 5,883,894 | 3/1999 | Patel et al. | 370/438 |
| 5,907,553 | 3/1999 | Kelly et al. | 370/433 |
| 5,922,052 | 7/1999 | Heaton | 709/223 |
| 5,923,663 | 7/1999 | Bontemps et al. | 370/445 |
| 5,946,301 | 8/1999 | Swanson et al. | 370/252 |

*Primary Examiner*—Chau Nguyen
*Assistant Examiner*—Chiho Andrew Lee

[57] ABSTRACT

A novel auto-negotiation system capable of performing auto-negotiation using negative link pulses. The auto-negotiation system operates in a network transceiver for interconnecting multiple hub communication devices having different operating speeds and link partners provided on a transmission medium. The network transceiver comprises physical layer devices for supporting data exchange between the hub devices and the link partners, and an auto-negotiation device that transmits and receives link pulses of a prescribed polarity carrying auto-negotiation information to and from the link partners to select a mode of communication between the hub devices and the link partners. A reverse polarity detection and correction circuit is provided for supporting auto-negotiation operations when link pulses received from a link partner have a reverse polarity. In a preferred embodiment, the reverse polarity detection and correction circuit comprises a polarity detector for detecting polarity of the link pulses received from the link partner, and a link pulse detector for distinguishing link pulses from data received from the link partner. A polarity reversing circuit responsive to the polarity detector and the link pulse detector reverses polarity of the received link pulses.

20 Claims, 5 Drawing Sheets

Normal Link Pulse (NLP) Sequence

AUTO-NEGOTIATION USING NEGATIVE LINK PULSES

This application claims priority of U.S. provisional application Ser. No. 60/082,183 filed Apr. 17, 1998, entitled "Quad Fast Ethernet Transceiver for 10 BASE-T100 BASE-X (QFEX 10/100)," the entire disclosure of which is incorporated by reference herein.

FIELD OF THE INVENTION

The present invention relates to data communications, and more particularly, to an auto-negotiation system capable of using negative link pulses.

BACKGROUND ART

Auto-negotiation defined in the IEEE Std. 802.3u 100Base-T supplement Clause 28 makes it possible for data communication devices to exchange information about their abilities over a link segment. This, in turn, allows the devices to perform automatic configuration to achieve the best possible mode of operation over a link. At a minimum, auto-negotiation can provide automatic speed matching for multi-speed communication devices at each end of a link. Multi-peed Ethernet interfaces can then take advantage of the highest speed offered by a multi-speed hub port.

The auto-negotiation protocol includes automatic sensing for other capabilities as well. For example, a hub that is capable of supporting full-duplex operation on some or all of its ports can use the auto-negotiation protocol to inform communication devices that they may operate in a fill-duplex mode. Interfaces connected to the hub that also support full-duplex operation can then configure themselves to use the full-duplex node in interaction with the hub.

Thus, auto-negotiation allows a data communication device to select the best transmission speed and transmission mode based on capabilities of the device at opposite side of the link. For example, device A supports transmission at 10 Mbps and 100 Mbps in half-duplex and full-duplex modes, and device B connected to device A supports 100 Mbps full-duplex mode. Since both ends of the link support 100 Mbps full-duplex mode, device A selects this mode. However, if device C connected to device A supports only 10 Mbps half-duplex mode, device A automatically detects these capabilities of device C, and selects 10 Mbps half-duplex mode.

A typical auto-negotiation block has transmit, receive and arbitration state machines defined by the transmit, receive and arbitration state diagrams respectively provided in FIGS. 28-14, 28-15 and 28-16 of the IEEE Std. 802.3 !00BASE-T supplement.

Auto-negotiation takes place using 100 ns link pulses. In 10BASE-T devices, such link pulses were employed for performing link integrity tests. A sequence of link pulses referred to as Normal Link Pulse (NLP) sequence is used for verifying link integrity, as defined in the 10BASE-T specification. As shown in FIG. 1, the NLP sequence consists of 10BASE-T Link Integrity Test Pulses transmitted every 16±8 ms. Auto-negotiation information is conveyed in Fast Link Pulse (FLP) signals, which are a modified version of the NLP signals. As shown in FIG. 2, the FLP signals are transmitted in bursts every 16±8 ms.

If a link partner is a 100 Mbps device with auto-negotiation ability, the stations on the both ends of the link exchange with the FLP signals. Upon receiving 3 consecutive and consistent FLP bursts, the capabilities of the link partner are recognized, and both stations are configured to transmit at 100 Mbps in a full-duplex or half-duplex mode. If a link partner is a 10 Mbps device, it responds to the FLP signals by sending back the NLP signals, instead of the FLP signals.

Normally, received FLP and NLP signals have a positive polarity. However, due to various errors, link pulses may become negative. In this case, a conventional auto-negotiation will not recognize an FLP or NLP signal. As a result, a communication error may occur. To ensure reliable auto-negotiation, it would be desirable to provide an auto-negotiation system capable of performing auto-negotiation using reverse polarity link pulses.

DISCLOSURE OF INVETION

The invention provides a novel auto-negotiation system capable of performing auto-negotiation using negative link pulses. The auto-negotiation system operates in a network transceiver for interconnecting multiple hub communication devices having different operating speeds and link partners provided on a transmission medium. The network transceiver comprises physical layer device for supporting data exchange between the hub devices and the link partners, and an auto-negotiation device that transmits and receives link pulses of a prescribed polarity carrying auto-negotiation information to and from the link partners to select a mode of communication between the hub devices and the link partners. A reverse polarity detection and correction circuit is provided for supporting auto-negotiation operations when link pulses received from a link partner have a reverse polarity.

In a preferred embodiment, the reverse polarity detection and correction circuit comprises a polarity detector for detecting polarity of the link pulses received from the link partner, and a link pulse detector for distinguishing link pulses from data received from the link partner. For example, the link pulse detector may be a window detector for detecting a time window of a prescribed width between the received link pulses. A polarity reversing circuit responsive to the polarity detector and the ink pulse detector reverses polarity of the received link pulses.

In accordance with the method of the present invention, auto-negotiation includes identifying received link pulses having a reverse polarity, and correcting their polarity.

Various objects and features of the present invention will become more readily apparent of those skilled in the art from which the following description of a specific embodiment thereof, especially when taken in conjunction with the accompanying drawings.

BEST MODE FOR CARRYING OUT THE INVETION

Although the invention has general applicability in the field of data communications, the best mode for practicing the invention is based in part on the realization of an auto-negotiation system in a Quad Fast Ethernet Transceiver supporting 10 Mbps and 100 Mbps data rates (QFEX 10/100).

Traditional Ethernet networks (10BASE-T) operate at 10 Mbps Ethernet protocol, as described by IEEE Standard 802.3; the majority of Ethernet interfaces currently operate at this data rate. However, a newer Ethernet standard, under IEEE standard 802.3u, accomplishes the faster operation of 100 BASE-T systems, at 125 Mbps using unshielded twisted pair (UTP) physical media. The 100BASE-T standard defines operation over two pairs of category 5 UTP (100BASE-T) and over four pairs of category 3 UTP. 100BASE-FX, covered by the 100BASE-T standard, allows operation over dual fiber optic cabling.

Figure 3:
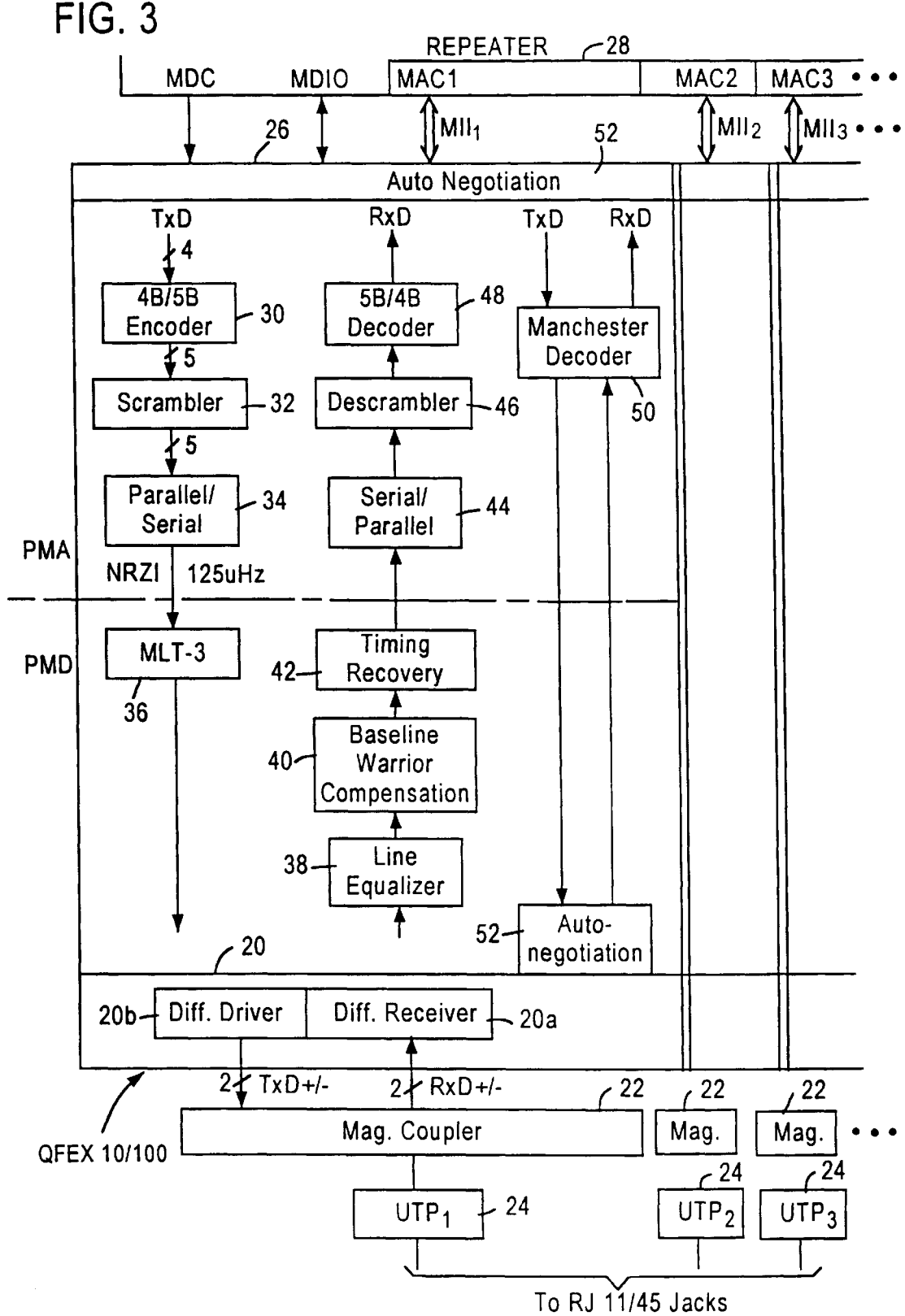
FIG. 3 is a block diagram of a data communications device, in which an auto-negotiation system of the present invention may be employed.

Referring to FIG. 3, a QFEX 10/100 chip 10, in accord with the invention, has four independent physical layer (PHY) devices PHY1, PHY2, PHY3 and PHY4, each of which is configured for supporting a physical layer interface 20 to a network medium, such as a 100BASE-TX or 10BASE-T Ethernet (EEE standard 802.3u) transmission medium. Physical layer devices PHY1 to PHY4 may independently transmit data signals TxD+/− and receive data signals RxD+/− via PHY ports 1 to 4, respectively, to and from external PHY devices, such as 100BASE-TX devices running at 100 Mbps and 10BASE-T devices running at 10 Mbps.

For each of the PHY ports 1 to 4, the physical layer interface 20 comprises a 10BASET/100BASE-X differential receiver 20a having pins RxD+ and RxD− for receiving serial input data For example, for 100BASE-TX, the differential receiver 20a accepts 3-level multiple level transition (ULT-3) signals RxD+/−. Also, for each of the PHY ports 1 to 4, the physical layer interface 20 comprises a 10BASE-T/100BASE differential driver 20b having pins TxD+ and TxD− for transmitting serial output data. A set of magnetic transformers 22 is used to connect the differential receivers 20a and differential drivers 20b to four unshielded twisted pairs (UTP) 24 coupled to corresponding jacks, such as RJ 11/45 jacks. For 100BASE-FX, the differential receiver 20a and differential driver 20b are connected to an external fiber-optical transceiver.

Also, the QFEX 10/100 chip 10 comprises media independent interface (MII) 26 having four ports MII1, MII2, MII3 and MII4 that support interconnection with four medium access control (MAC) interfaces of a 10/100 repeater or switch 28 running at 10 Mbps or 100 Mbps. Each of the MII ports MII1, MII2, MII3 and MII4 can independently operate in accordance with section 22 of the IEEE 802.3u standard specification to support a MII interface at 10 Mbps or 100 Mbps in a half-duplex or a fall-duplex mode. A management data clock (MDC) input and a management data input/output (MDIO) compliant with the IEEE 802.3 standard are arranged to provide management control of the QFEX 10/100.

To support interconnection between the MII ports and the PHY ports, each PHY device of the QFEX 10/100 has two transmit data paths and two receive data paths. In particular, transmit data TxD from each MII port may be transferred to the corresponding PHY port via a 10 Mbps transmit data path or a 100 Mbps transmit data path depending on the data rate of the repeater or switch. Receive data RxD from each PHY port to the corresponding MII port may be supplied via a 10 Mbps receive data path or a 100 Mbps receive data path depending on the data rate at which the external PHY device is running.

For example, each 100 Mbps transmit data path may comprises a 4-bit to 5-bit encoder 30 that outputs 5-bit data, a scrambler 32 that produces pseudorandom non-return-to-zero-inverted (NRZI) data, a parallel to serial shift register 34 producing a 125 MHz NRZI data stream, and an MLT-3 encoder 36 that generates a transmit data signal TxD+/− signal having three levels: 0, +1, and −1.

Each 100 Mbps receive data path may include a line equalizer 36 that performs line equalization to compensate for high frequency attenuation in the twisted pair 24, a baseline wander correction circuit 40 that compensates for lower frequency attenuation caused by the magnetic transformers 22, a timing recovery circuit 42 used to recover the data and the clock to produce synchronous data, a serial to parallel converter 44, a descrambler 46, and a 5-bit to 4-bit decoder 48 that produces 4-bit receive data RxD supplied to the corresponding MII port.

Each of the 10 Mbps receive and transmit paths comprises a Manchester encoder-decoder 50 which decodes Manchester encoded transmit data TxD supplied from the corresponding MII port and encodes the data signals RxD+/− received from the external PHY device. When the external PHY device is run at 10 Mbps, the 100 Mbps transmit and receive paths are bypassed to provide communication via the 10 Mbps transmit and receive paths. The PHY devices PHY1 to PHY4 may contain multiplexers (not shown) that provide switching between 10 Mbps data paths and 100 Mbps data paths.

The QFEX 10/100 chip 10 integrates an auto-negotiation system 52 that performs an auto-negotiation protocol defined in the IEEE Std. 802.3u 100Base-T supplement Clause 28 to select the best transmission rate and transmission mode based on user requirements and capabilities of the external PHY devices. In particular, the auto-negotiation system 52 controls the multiplexers that provide switching between 10 Mbps and 100 Mbps data paths.

Via the differential drivers 20b, the auto-negotiation system 52 transmits to a link partner Fast Link Pulse (FLP) signals, which may be generated automatically at power-up, and transmitted in bursts every 16±8 ms. As discussed in more detail later, in response to the transmitted FLP signals, the auto-negotiation system 52, via the differential receivers 20a, receives FLP or NLP signals from the link partner.

Each FLP burst consists of 33 pulse positions, of which 17 odd pulse positions convey clock information, and 16 even pulse positions convey data information. The presence of a pulse in a data pulse position represents a logical 1, whereas the absence of a pulse represents a logical 0.

The data pulse positions form a Link Code Word having bits D0 to D15 corresponding to data being conveyed. In particular, the bits D0 to D4 form a selector field that indicates a device type, e.g. a 802.3 device. The bits D5 to D12 represent a technology ability field that identifies the subset of technology in a specific selector group, e.g. 10Base-T, 100Base-TX/T4, full-duplex, half-duplex, etc.

A priority table defined in the 802.3 standard is used to ensure that the highest common denominator ability is chosen as a result of auto-negotiation. The full-duplex mode of operation is given higher priority than the half-duplex mode, since a full-duplex system can send more data than a half-duplex link operating at the same speed. Therefore, if the devices at both ends of the link can support full-duplex operation, they will automatically configure themselves for the higher performance full-duplex mode. Further, if both devices on the link can support 100 Mbps data rate, then the auto-negotiation system will configure the PHY device of the QFEX 10/100 to operate at 100 Mbps instead of 10 Mbps.

The bit D13 of the Link Code Word is called a remote fault bit. This bit indicates the presence of a fault from a remote link partner. The bit D14 is an acknowledge bit that acknowledges the successful receipt of 3 identical Link Code Words from a link partner. Finally, the bit D15 is a next page bit that indicates that a device wishes to send at least one additional Link Code Word following the current word being exchanged. For example, if the remote fault bit D13 indicates the presence of a fault, the next page bit D15 may be set to identify the precise type of the fault.

The MII interface 26 provides access to MII management registers involved in an auto-negotiation procedure. The MII management registers may include an advertisement register for holding a Link Code Word to be transmitted, a link partner ability register for storing the received Link Code Word representing the advertised ability of the link partner, and an expansion register for storing miscellaneous auto-negotiation information, such as data relating to ability of the link partner to perform auto-negotiation, and a page received from the link partner. A next page transmit register may be used for holding a next page to be transmitted, if the auto-negotiation system 52 supports the transmission of at least one next page.

If a link partner is a 100BASE-X device with the auto-negotiation ability, the stations on the both ends of the link exchange with the FLP signals. Upon receiving 3 consecutive and consistent FLP bursts, the capabilities of the link partner are recognized, and both stations are configured to transmit at 100 Mbps in a full-duplex or half-duplex mode.

If a link partner is a 10BASE-T device, it responds to the FLP signals send by the QFEX 10/100 by sending back the NLP signals, instead of the FLP signals. The auto-negotiation system 52 detects the NLP signals, and configures the QFEX 10/100 to support the communication in a 10Base-T mode at 10 Mbps.

In accordance with the 802.3 standard, auto-negotiation is carried out using a receive state machine RSM, an arbitration state machine ARSM and a transmission state machine TxSM respectively defined by receive, arbitration and transmission state diagrams. In particular, the transmit state machine TxSM performs the transmission of the FLP bursts from the advertisement register advertising abilities of the QFEX10/100, ensures a proper separation between pulse positions in the FLP burst, and sends acknowledgements ACK in response to received signals. The receive state machine RSM detects FLP bursts from the link partner and decodes the Link Code Word. The arbitration state machine ARSM controls enabling and disabling of the transmit state machine, transfers the transmit Link Code Word from the advertisement register to the transmit state machine TxSM, transfers the received Link Code Word from the receive state machine to the link partner ability register, and interacts with the MII management registers to provide control and status information. Also, the 802.3 standard defines the NLP receive link integrity test state diagram which are responsible for performing a link integrity test for received NLP signals.

Various statuses of the state machines are represented by state diagram variables defined in the 802.3 standard. For example, the ability_match variable indicates that 3 consecutive Link Code Words match, the acknowledgement_match variable indicates that 3 consecutive Link Code Words match and have the Acknowledge bit set, the link-pulse variable indicates that a valid Link Pulse has been received, the flp_link_good variable indicates that auto-negotiation has completed, etc.

Figure 4:
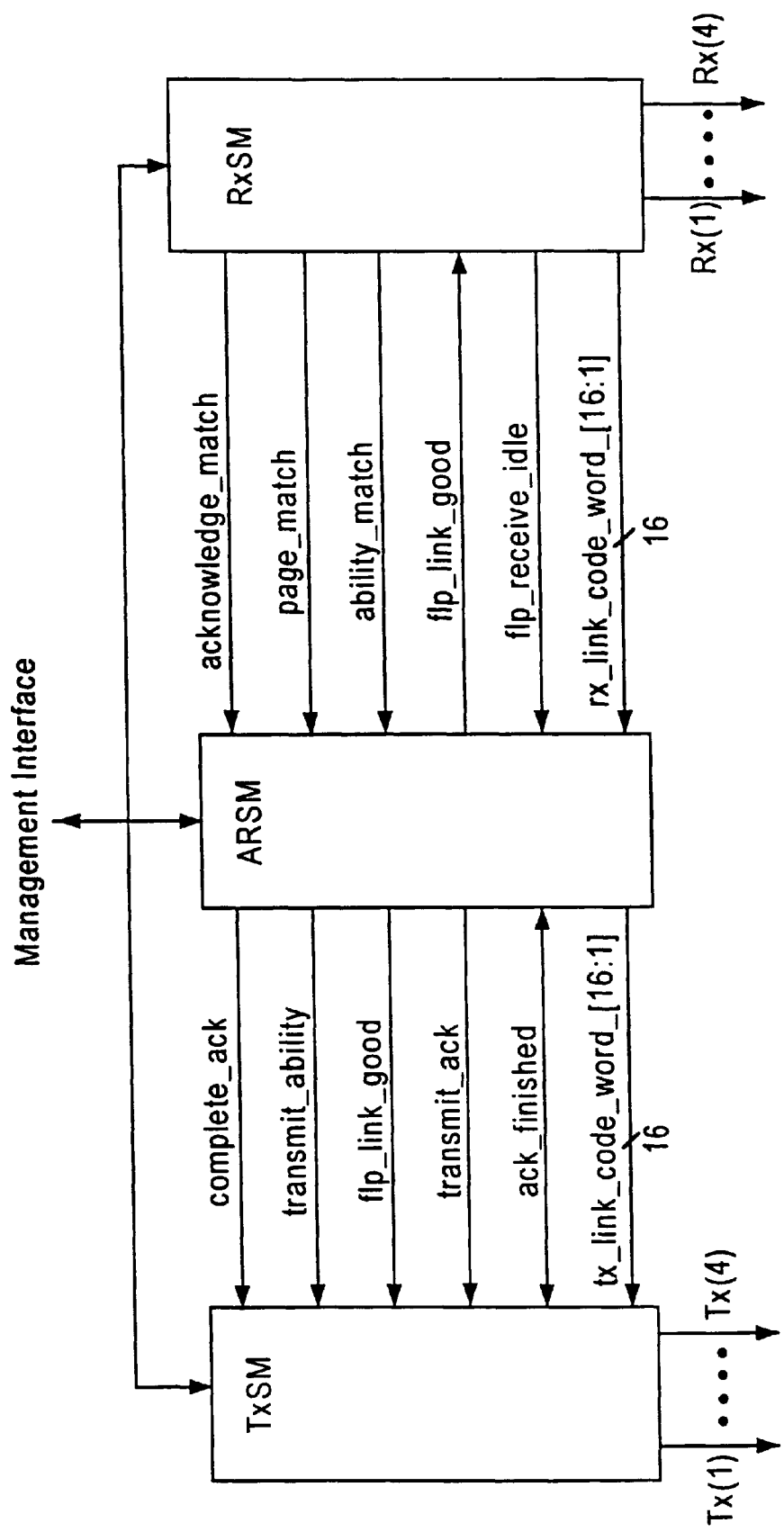
FIG. 4 is a functional diagram illustrating interactions between transmit, receive and arbitration state machines.

FIG. 4 shows a functional diagram illustrating interaction between the transmit TXSM, receive RxSM and arbitration ARSM state machines in the auto-negotiation unit 104. The transmit state machine TxSM provides the transmission of transmit signals Tx(1) to Tx(4) including corresponding FLP bursts via the PHY ports 1 to 4, respectively, of the QFEX 10/100.

The arbitration state machine ARSM enables the transmission of the FLP bursts by sending to the transmit state machine TxSM the transmit_ability variable that controls the transmission of the Link Code Word having the tx_link_code word[16:1] also transferred from the arbitration state machine ARSM to the transmit state machine TxSM. The tx_link_code_word[16:1] is a 16-bit array containing data bits to be transmitted in an FLP burst.

Further, the arbitration state machine ARSM supplies the transmit state machine TxSM with the transmit_ack variable that controls the setting of the Acknowledge bit in the tx_link_code_word[16:1] to be transmitted. The complete_ack variable controls counting of the transmitted Link Code Words that have their Acknowledge bit set. The ack_finished variable sent by the arbitration state machine ARSM to the transmit state machine TxSM indicates that the final Link Code Words with the Acknowledge bit set have been transmitted.

Receive signals Rx(1) to Rx(4) for PHY ports 1 to 4, respectively, of the QFEX 10/100 are supplied to the receive state machine RXSM, which sends to the arbitration state machine ARSM state diagram variables acknowledge_match, page_match, ability_match, flp_receive_idle and rx_link_code word_[16:1] for the corresponding ports. The acknowledge_match variable indicates that 3 consecutive Link Code Words match and have the Acknowledge bit set. The page_match indicates that the received page matches. The ability_match variable indicates that 3 consecutive Link Code Words match, ignoring the Acknowledge bit. The flp_receive_idle variable indicates that the receive state diagram is in the idle state. Finally, the rx_link_code_word_[16:1] variable is a 16-bit array that contains the data bits received from an FLP burst.

When auto-negotiation is complete, the arbitration state machine ARSM supplies the receive state machine RXSM and the transmit state machine TxSM with the flp_link_good variable to place the receive and transmit state machines to an idle state.

The arbitration state machine ARSM via a management interface interacts with the MII management registers that provide management and control of the auto-negotiation procedure. As discussed above, the NM management registers include an auto-negotiation advertisement register, an auto-negotiation link partner ability register, an auto-negotiation extension register, and an auto-negotiation next page register.

The auto-negotiation advertisement register is provided for each PHY port of the QFEX10/100 to store data representing the advertised ability of the QFEX 10/100. The bits of this register may advertise to the link partner device the ability of the QFEX 10/100 to support full-duplex and half-duplex 100BASE-TX operations, and full-duplex and half-duplex 10BASE-T operations. Via the arbitration state machine ARSM, data from the advertisement register are transferred to the transmit state machine TXSM for transmission to a link partner.

The auto-negotiation link partner ability register provided for each PHY port of the QFEX 10/100 contains data relating to the advertised ability of the link partner. These data are transferred from the receive state machine RXSM via the arbitration state machine ARSM.

The auto-negotiation expansion register provides additional auto-negotiation information such as ability of the link partner to support auto-negotiation or a next page mode, and the auto-negotiation next page register contains the next page Link Code Word to be transmitted.

Figure 1:
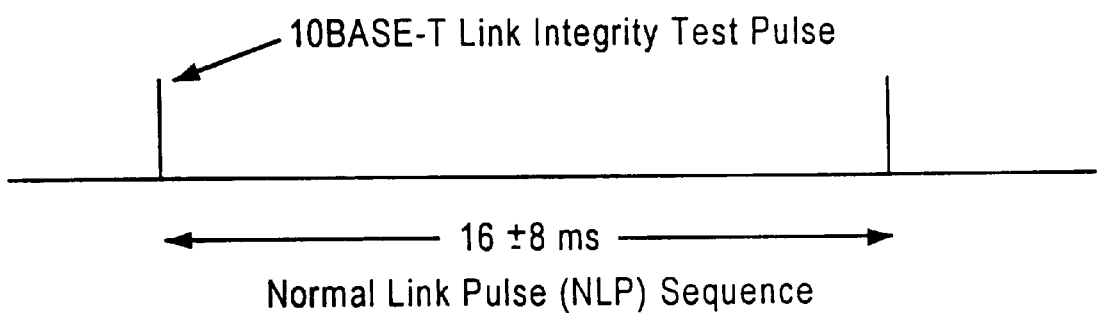
FIG. 1 is a diagram illustrating NLP signals.
Figure 2:
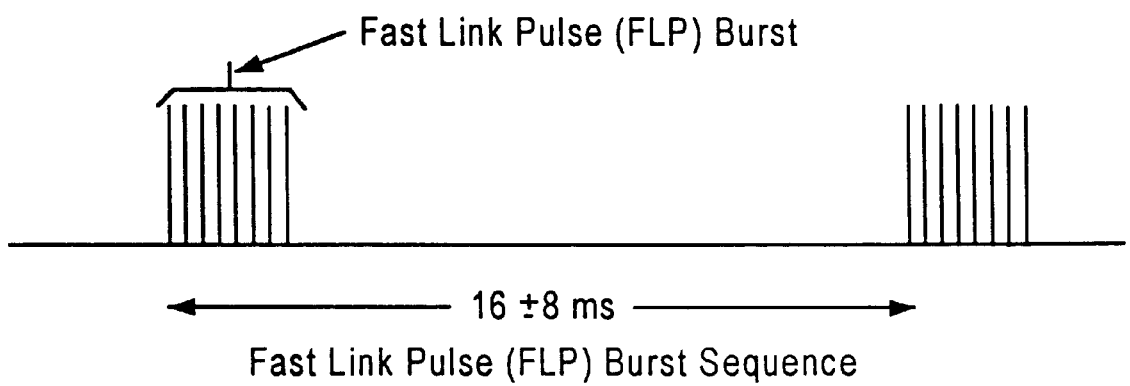
FIG. 2 is a diagram illustrating FLP signals.
Figure 5:
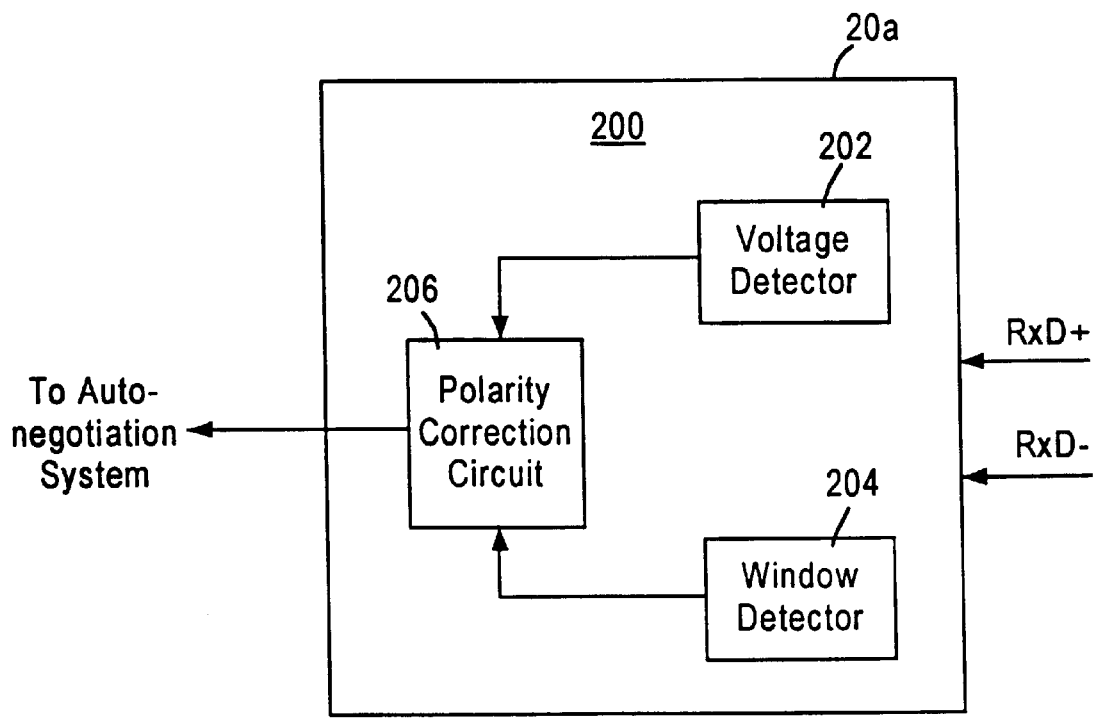
FIG. 5 is a diagram showing a reverse polarity detection and correction circuit of the present invention.

As shown in FIGS. 1 and 2, the 802.3 standard requires link pulses in the FLP and NLP signals to have the positive polarity. However, due to wrong wiring of a magnetic coupler at a transmission side of the link partner or some other error, link pulses may become negative. FIG. 5 schematically illustrates a reverse polarity detection and correction circuit 200 of the present invention which enables the QFEX 10/100 chip 10 to perform auto-negotiation using negative link pulses. The reverse polarity detection and correction circuit 200, which may be arranged in the differential receiver 20a of each PHY ports 1 to 4, comprises a voltage detector 202, a window detector 204 and a polarity correction circuit 206.

The voltage detector 202 is supplied with an input signal received via the pins RxD+/RxD− from an external 10 Mbs or 100 Mbps device to determine the polarity of the input signal. For example, a differential amplifier may be used as the voltage detector 202.

The window detector 204 is used to distinguish link pulses from data. It checks the input signal to determine whether or not it contains a 16±8 ms time window between pulses, prescribed by the 802.3 standard for FLP and NLP signals. If the 16±8 ms time window is detected, the window detector 204 concludes that the received signal is an FLP or NLP signal.

A polarity correction circuit 206 is controlled by the voltage detector 202 and window detector 204. When the window detector 204 detects that a received signal is an FLP or NLP signal, and the voltage detector 202 determines that the received signal has the negative polarity, the polarity correction circuit 206 reverses the polarity of the received signal to supply the auto-negotiation system 52 with a positive link pulse. As a result, the auto-negotiation system 52 is enabled to operate with link pulses of any polarity.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative way, rather than in a restrictive sense. For example, the invention is applicable in standards other than 10BASE-T/100BASE-TX, for example 100BASE-FX in which fiber optic interfacing is added, and some signal processing varied, in ways known to persons skilled in the art

What is claimed is:

1. A network transceiver for interconnecting hub communication devices with a link partner provided on a transmission medium, said network transceiver comprising:
   at least one physical layer device for supporting data exchange between said hub communication devices and said link partner,
   an auto-negotiation device for transmitting and receiving link pulses of a prescribed polarity carrying auto-negotiation information to and from said link partner to select a mode of communication between said hub communication devices-and said link partner, and
   a reverse polarity detection and correction circuit for supporting auto-negotiation operations when said link pulses received from said link partner have a polarity reverse to the prescribed polarity.

2. The transceiver of claim 1, wherein said reverse polarity detection and correction circuit comprises a polarity detector for detecting said received pulses having the reverse polarity.

3. The transceiver of claim 2, wherein said reverse polarity detection and correction circuit comprises a link pulse detector for distinguishing the link pulses from data received from said link partner.

4. The transceiver of claim 3, wherein said link pulse detector comprises a window detector for detecting a time window of a prescribed width between the received link pulses.

5. The transceiver of claim 3, wherein said reverse polarity detection and correction circuit comprises a polarity reversing circuit responsive to said polarity detector and said link pulse detector for reversing polarity of the received link pulses.

6. The transceiver of claim 1, wherein the link pulses are auto-negotiation signals compliant with the IEEE Standard 802.3.

7. The transceiver of claim 1, wherein said auto-negotiation device supports auto-negotiation for a full-duplex or half-duplex mode of transmission.

8. The transceiver of claim 1, wherein said auto-negotiation device supports auto-negotiation for transmission at a first data rate or at a second data rate.

9. The transceiver of claim 8, wherein said physical layer device comprises a first data path for supporting data exchange between said hub devices and said link partner at the first data rate.

10. The transceiver of claim 9, wherein said physical layer device comprises a second data path for supporting data exchange between said hub devices and said link partner at the second data rate.

11. The transceiver of claim 1, including a magnetic coupler for coupling to said medium.

12. The transceiver of claim 1, wherein said medium is unshielded twisted pair (UTP) wiring.

13. An Ethernet transceiver, comprising
   a media independent interface (MII) for communicating with a MII data communication device,
   a physical layer (PHY) interface having a PHY port for establishing a data link with a link partner,
   a first data path established between the PHY port and the MII interface for providing data communications at a first data rate,
   a second data path established between the PHY port and the MII interface for providing data communications at a second data rate,
   an auto-negotiation circuit for transmitting and receiving link pulses of a prescribed polarity carrying auto-negotiation information to and from the link partner for performing auto-negotiation with the link partner to select between data communications at the first data rate and at the second data rate, and
   a reverse polarity circuit for supporting auto-negotiation operations when the link pulses received from said link partner have a polarity reverse to the prescribed polarity.

14. The transceiver of claim 13, wherein said reverse polarity circuit comprises a polarity detector for detecting received pulses having the reverse polarity.

15. The transceiver of claim 14, wherein said reverse polarity detection and correction circuit comprises a link pulse detector for distinguishing the link pulses from data received from said link partner.

16. The transceiver of claim 15, wherein said link pulse detector comprises a window detector for detecting a time window of a prescribed width between the received link pulses.

17. The transceiver of claim 16, wherein said reverse polarity detection and correction circuit comprises a polarity reversing circuit responsive to said polarity detector and said link pulse detector for reversing polarity of the received link pulses.

18. The transceiver of claim 13, wherein the link pulses are auto-negotiation signals compliant with the IEEE Standard 802.3.

19. A method of performing auto-negotiation between data communications devices, comprising the steps of:

transmitting link pulses of a prescribed polarity carrying auto-negotiation information, receiving link pulses carrying auto-negotiation information from a link partner, and having a polarity reverse to the prescribed polarity, and correcting the polarity of the received link pulses.

20. The method of claim 19, further comprising the step of distinguishing the received link pulses from data.

* * * * *